United States Patent
Schmidl et al.

(10) Patent No.: US 7,184,457 B2
(45) Date of Patent: Feb. 27, 2007

(54) SPREAD SPECTRUM PATH ESTIMATION

(75) Inventors: Timothy M. Schmidl, Dallas, TX (US); Srinath Hosur, Plano, TX (US); Anand Dabak, Plano, TX (US); Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 848 days.

(21) Appl. No.: 09/792,123

(22) Filed: Feb. 23, 2001

(65) Prior Publication Data
US 2002/0006158 A1  Jan. 17, 2002

Related U.S. Application Data

(60) Provisional application No. 60/185,325, filed on Feb. 28, 2000.

(51) Int. Cl.
*H04B 1/00* (2006.01)
(52) U.S. Cl. .................. 375/130; 375/347; 375/349
(58) Field of Classification Search ............. 375/130, 375/140, 141, 142, 143, 144, 147, 148, 150, 375/152, 343, 367; 370/515
See application file for complete search history.

(56) References Cited

U.S. PATENT DOCUMENTS

| | | | | | |
|---|---|---|---|---|---|
| 4,513,383 | A | * | 4/1985 | Hackett, Jr. | 702/190 |
| 6,125,137 | A | * | 9/2000 | Wang et al. | 375/148 |
| 6,345,078 | B1 | * | 2/2002 | Basso | 375/349 |
| 6,408,039 | B1 | * | 6/2002 | Ito | 375/347 |
| 6,580,750 | B2 | * | 6/2003 | Aue | 375/150 |
| 6,625,197 | B1 | * | 9/2003 | Lundby et al. | 375/130 |

FOREIGN PATENT DOCUMENTS

GB  2 331 901 A  6/1999

* cited by examiner

*Primary Examiner*—Jean B. Corrielus
(74) *Attorney, Agent, or Firm*—Carlton H. Hoel; W. James Brady; Frederick J. Telecky, Jr.

(57) ABSTRACT

Spread spectrum rake receiver estimates number of paths within a chip interval and assigns corresponding fingers. Cross-correlation matrix eigenvalues or direct BER estimates for differing numbers of fingers determine whether one or two fingers assigned to the group of paths within a chip.

5 Claims, 3 Drawing Sheets

FIG. 3
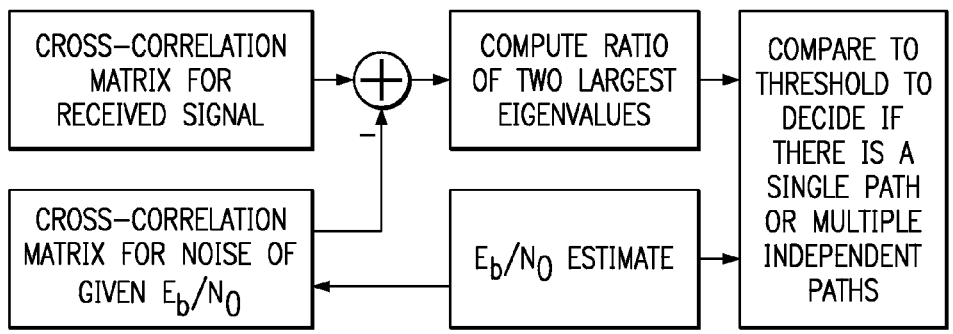
FIG. 4
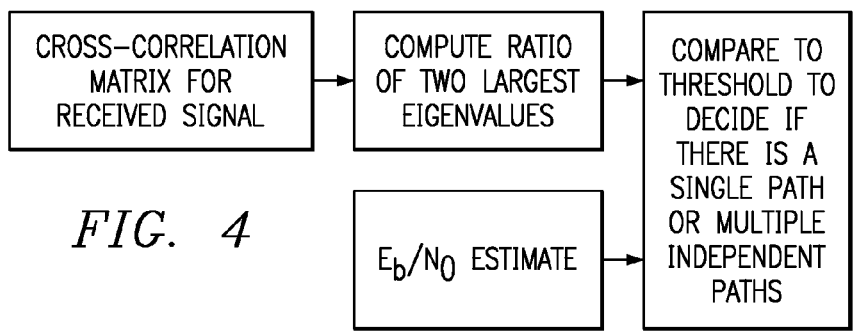
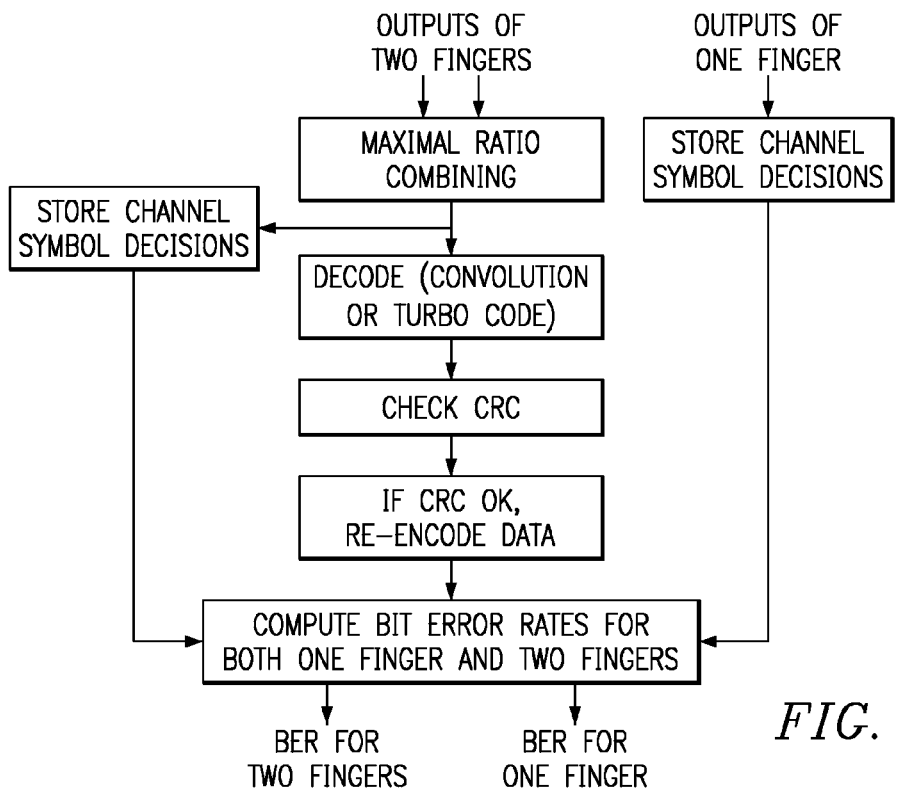
FIG. 5

FIG..6
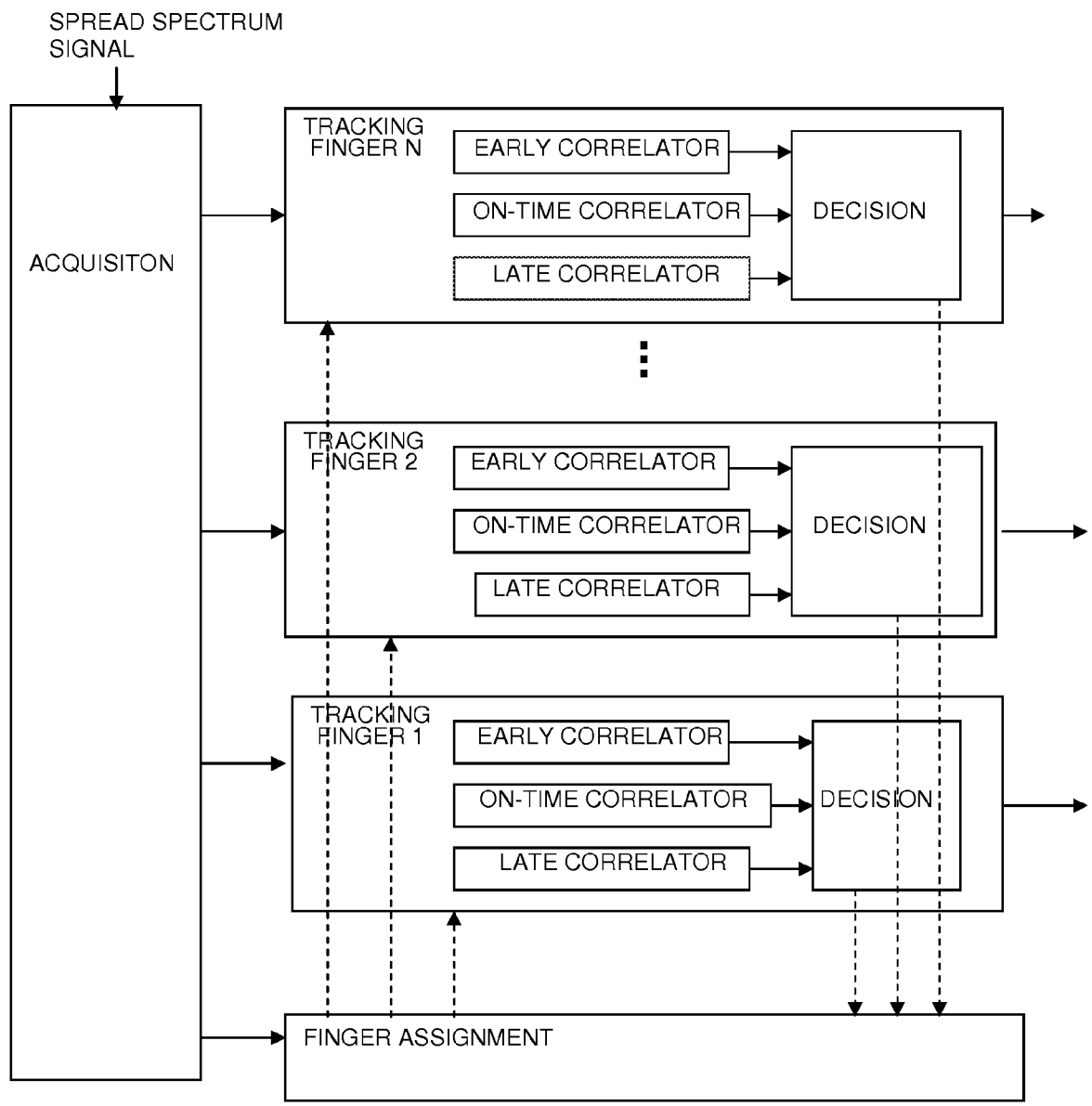

SPREAD SPECTRUM PATH ESTIMATION

CROSS-REFERENCE TO RELATED APPLICATIONS

This application claims priority from provisional application Ser. No. 60/185,325, filed Feb. 28, 2000.

BACKGROUND OF THE INVENTION

The present invention relates to digital communications, and more particularly to mobile wireless systems and methods.

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) received spread spectrum signals and recovery of information. Such multiple access typically appears under the name of code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while other users' interfering signals appear noise-like. For example, the interim standard IS-95 for such CDMA communications employs channels of 1.25 MHz bandwidth and a pseudo-random code pulse (chip) interval $T_c$ of 0.8138 microsecond with a transmitted symbol (bit) lasting 64 chips. The wideband CDMA (WCDMA) proposal employs a 3.84 MHz bandwidth and the CDMA code length applied to each information symbol may vary from 4 chips to 256 chips. The UMTS (Universal Mobile Telecommunications System) approach UTRA (UMTS Terrestrial Radio Access) provides a spread spectrum cellular air interface with both FDD (frequency division duplex) and TDD (time division duplex) modes of operation. UTRA currently employs 10 ms duration radio frames partitioned into 15 time slots with each time slot consisting of 2560 chips (chip interval $T_c$=260 nanoseconds).

The CDMA code for each user is typically produced as the modulo-2 addition of a Walsh code with a pseudo-random code (two pseudo-random codes for QPSK modulation) to improve the noise-like nature of the resulting signal. A cellular system could employ IS-95 or WCDMA for the air interface between a base station and multiple mobile user stations.

A spread spectrum receiver synchronizes with the transmitter in two steps: code acquisition followed by code tracking. Code acquisition performs an initial search to bring the phase of the receiver's local code generator to within typically half a chip of the transmitter's, and code tracking maintains fine alignment of chip boundaries of the incoming and locally generated codes. Conventional code tracking utilizes a delay-lock loop (DLL) or a tau-dither loop (TDL), both of which are based on the well-known early-late gate principle.

In particular, a DLL correlates the received signal with two outputs of the local code generator: one delayed by $\delta$ and one advanced by $\delta$ where the offset $\delta$ is less than one chip interval ($T_c$). The result of these two correlations, together with the correlation at the perceived "on-time" instant, form the decision statistics of the time tracking unit. The time tracking method can be coherent or non-coherent. The former approach attempts to eliminate the phase rotation introduced by the channel and remove in this way the phase dependence from the decision statistics. The latter approach removes the phase dependence by squaring the result of the correlation and considering only the resulting magnitude. The latter approach is simpler, and for the cases of interest, it provides practically the same symbol-error-rate (SER) performance as the former.

The late $R_+(\delta)$ and early $R_-(\delta)$ correlations of the local code with the received signal are squared and subtracted. The sign of the result indicates towards which of the two instants the actual on-time instant of the received signal is closer. The value of the result indicates the degree of proximity. Since the value of the result also depends on the strength of the received signal, to remove this dependence and have the final decision statistic depend only on the time error, the result of the subtraction is divided by the square of the correlation at the perceived on-time instant. This serves to normalize the decision statistic in terms of signal power. The final decision statistic is therefore given as $$S=[R_+(\delta)^2-R_-(\delta)^2]/R(0)^2$$

and depends only on the time error and not on the received signal power or phase. S is known as the discriminator curve or S-curve (because of its shape) of the tracking loop. The absolute value of S is compared against a threshold value and, if it is larger, the on-time sampling instant is changed by one sample in the direction specified by the sign of S; while if it is smaller, no change is made in the sampling instant. The purpose of the threshold is to ensure that a time correction takes place only when the time error exceed a certain value and to help guard to a certain extent against poor quality values of the decision statistic that may be caused by noise and fading.

The TDL operates analogously but employs only a single multiply loop. The TDL dithers the clock (forward and backward delay) by $\delta$ and emulates the DLL with a comparison of advanced and delayed clock samples of the code multiplication with the received signal. Typically, DLL/TDL circuitry utilizes sampling of various signals at rates such as 8 samples per chip (or 4 samples per chip), and the offset $\delta$ would be in the range of 1–4 samples (or 1–2 samples for a sampling rate of 4 samples per chip).

The air interface leads to multipath reception from a single transmitter, and a rake receiver has individual demodulators (fingers, tracking units) tracking separate paths and combines the finger outputs to improve signal-to-noise ratio (SNR or $E_b/N_0$). The combining may use a method such as the maximal ratio combining (MRC) in which the individual detected signals in the fingers are synchronized and weighted according to their signal strengths or SNRs and summed to provide the decoding statistic. That is, a rake receiver typically has a number of DLL or TDL code tracking loops together with control circuitry for assigning tracking units to the strongest received paths.

However, in many applications, the time separation of multiple paths is less than or equal to the range of the discriminator characteristic of the tracking DLL/TDL. Moreover, such multipaths are nearly continuous in nature in the sense that there are frequently strong enough paths with time separation much less than one chip interval. Whenever such paths cannot be separated, they appear as a single path that exhibits fading. In many communication environments, such as urban and indoor, there is a considerable probability that sufficiently strong multipaths are separated by an amount comparable to the chip interval and hence are well within the non-zero range of the discriminator characteristic of the DLL/TDL tracking loop. The discriminator characteristic (S-curve) is typically non-zero for an advance/delay of up to 1.2–1.5 chips depending on the value of the early/late offset δ. Prominent examples of communication systems that exhibit these problems are the IS-95 and wideband CDMA cellular/PCS systems in urban and indoor environments.

Whenever two or more paths that are used for demodulation (as in a Rake receiver) are separated in time by less than the non-zero range of the discriminator characteristic of the tracking DLL/TDL, the decision statistic of the DLL/TDL for each path is affected by the presence of the other path. In other words, the shape of the S-curve itself may change and the actual results may be different than the ones theoretically expected. This can significantly degrade the performance of the conventional DLL/TDL and lead to unacceptably large time errors. Moreover, the decision statistics for the weaker path may be completely overwhelmed by the presence of the interfering, stronger path. This can lead to complete loss of synchronization for the weaker path. It is therefore highly desirable to mitigate those effects and eliminate the shortcomings of the conventional DLL/TDL time tracking methods in multipath channels. The problem of having interfering paths affecting the decision statistics of the tracking unit of a desired path was identified by A. Baier et al., "Design Study for a CDMA-Based Third Generation Mobile Radio System", IEEE JSAC, Vol. 12, May 1994, pp. 733–743. The authors proposed tracking the envelope of each path instead of relying on the tracking unit decision statistics.

When two (or more) paths have a phase difference within one chip, then having a finger assigned to each path provides gain due to the path diversity. However, if the two paths coalesce into a single path, then two fingers assigned to the same path results in a loss due to the extra noise introduced.

SUMMARY OF THE INVENTION

The present invention provides demodulation apparatus and methods for a spread spectrum multipath group with path phase differences of less than a chip interval which assign one or two demodulators to the group depending upon analysis of any gain from two fingers.

This has advantages including diversity gain when two (or more) distinct paths have phases within a chip and avoids added noise when two fingers are assigned to the same path.

BRIEF DESCRIPTION OF THE DRAWINGS

FIG. 3 illustrates steps of a method of eigenvalue analysis to make path multiplicity determination using the cross-correlation matrix plus a noise estimate matrix.

FIG. 4 illustrates steps of a second method of eigenvalue analysis to make path multiplicity determination using only the cross-correlation matrix.

FIG. 5 illustrates steps of a method of path multiplicity determination by bit error rate analysis.

FIG. 6 shows receiver functional blocks for path multiplicity determination and finger assignment.

DESCRIPTION OF THE PREFERRED EMBODIMENTS

1. Overview

For spread spectrum reception there are significant gains that can be achieved by assigning multiple closely-spaced fingers of a rake receiver when there are two or more independent paths with phase differences within a chip interval. Gains of 3 to 6 dB in $E_b/N_0$ are obtained in indoor and pedestrian channels mainly from the added diversity of the second independent path. Preferred embodiment methods determine whether there are significant multiple independently varying paths within a chip interval by (1) comparison of eigenvalues of a cross-correlation matrix of early, on-time, and late samples and/or (2) comparison of bit error rates (BER) of the alternatives of one or two finger assignments. And preferred embodiment receivers assign fingers pursuant to periodic application of a preferred embodiment path multiplicity determination method.

Preferred embodiment air interface communications systems have at least one transmitter/receiver (e.g., a base station in a cellular system or a mobile user) utilizing a preferred embodiment method of rake finger assignment for reception.

In preferred embodiment cellular communications systems base stations and mobile users could each include one or more digital signal processors (DSP's) and/or other programmable devices with stored programs for performance of the signal processing of the preferred embodiment methods. Alternatively, specialized circuitry (ASICs) or a combination with DSPs could be used. The base stations and mobile users may also contain analog or mixed-signal integrated circuits for amplification and/or filtering of inputs to or outputs from antennas and for conversion between analog and digital; and these analog and digital circuits may be integrated on a single die. The stored programs may, for example, be in ROM or flash EEPROM or FeRAM integrated with the processor or external to the processor. The antennas may be parts of receivers with multiple finger rake detectors for each user's signals. Exemplary DSP cores could be in the TMS320C6xxx or TMS320C5xxx families from Texas Instruments.

Figure 1:
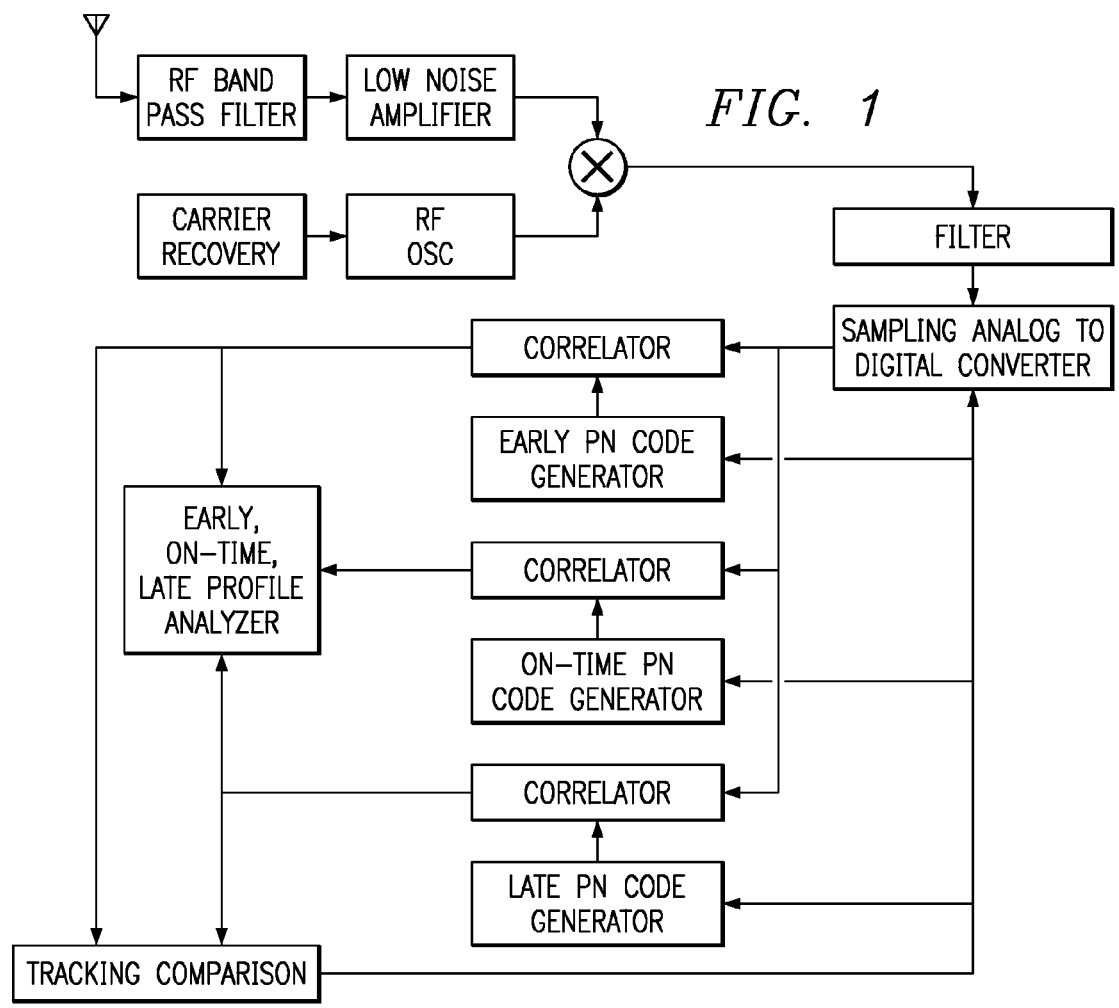
FIG. 1 shows receiver functional blocks with early, late, and on-time correlators for early-late tracking.

FIG. 1 shows receiver functional blocks for early-late tracking including the analog front end of antenna, RF bandpass filter, low noise amplifier, carrier recovery, RF oscillator, mixing down, fitering, and sampling analog-to-digital conversion. The early, on-time, and late correlators generate the $R_{30}(\delta)$, $R(0)$, and $R_{-}(\delta)$ statistics for tracking control. FIG. 6 shows rake receiver functional blocks for the path multiplicity determination and finger assignment including an acquisition unit for code acquisition, fingers for early-late tracking (as in FIG. 1) plus path multiplicity determination (using a preferred embodiment method), and a finger assignment unit which can use the path multiplicity determinations for finger assignments.

2. Eigenvalue Ratio Preferred Embodiments

Figure 2:
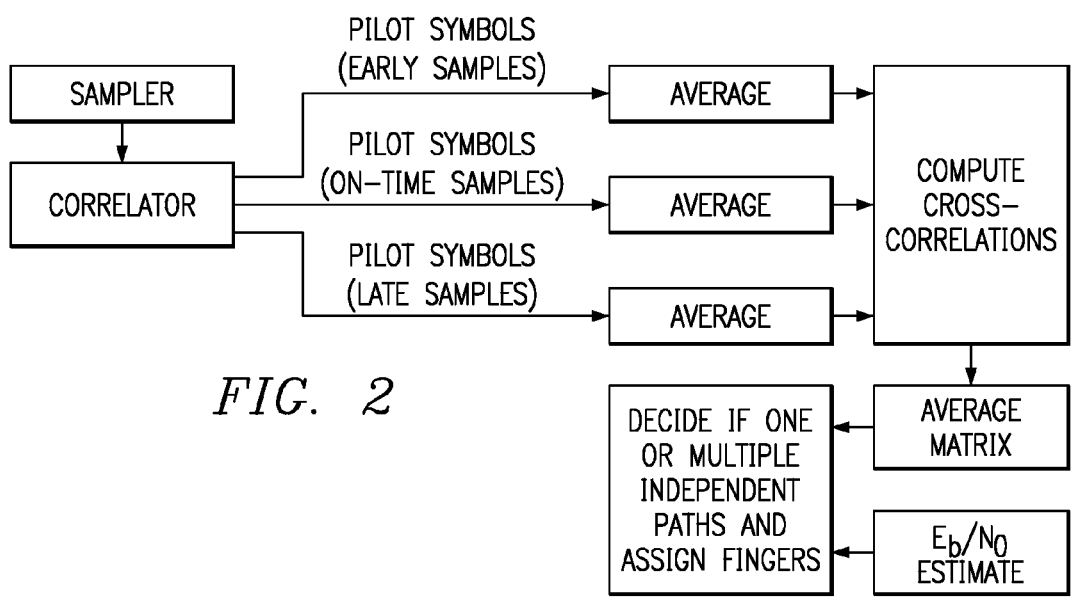
FIG. 2 illustrates steps of a method of formation of early, late, and on-time cross-correlations matrix and path multiplicity determination plus finger assignment.

FIGS. 2–4 illustrate preferred embodiment methods to determine whether one or two fingers of a rake receiver should be assigned to a group of paths which have phases separated by less than a chip interval. The method analyzes the eigenvalues of the matrix of summed cross-correlations between the early, on-time, and late samples of the received baseband signal. In more detail, the preferred embodiment method proceeds with the following steps, presuming a WODMA-type baseband signal consisting of a sequence of pilot symbols (each pilot symbol is 1+j in QPSK) or pilot symbols interleaved with data symbols and spread with a 256-chip code and then scrambled. Each 10-ms duration radio frame consists of 15 time slots with each time slot containing 10 symbols (2560 chips), so the symbol rate is 15 ksps.

(1) Perform an (standard) acquisition search of a received spread spectrum signal to achieve coarse (half chip resolution) alignment; this determines the phase locations of all groups of received paths with signal exceeding a threshold where a group of paths means one or more paths with phase differences within a chip interval. (A phase difference equal to one chip interval of 260 ns corresponds to a path length difference of about 80 m.) In particular, correlate the received baseband signal with offset versions of the code to detect groups of paths by comparisons to a threshold, and for each group exceeding the threshold assign a finger (tracking unit) with initial coarse synchronization of its local code generator to within a half chip for the group.

(2) For each group of paths with an assigned finger from step (1), perform fine synchronization by adjusting the code generator towards the 0 of discriminator $S=[R_+(\delta)^2-R_-(\delta)^2]R(0)^2$ where $\delta$ is taken as 2 samples (¼ chip), and as before, $R(0)$ is the cross-correlation of the received signal with the on-time local code, and $R_\pm(\delta)$ are the cross-correlations of the received signal with the early and late local code. Explicitly, let $r(n)$ be the sampled baseband received pilot symbol signal and $c(n)$ the local code; that is, every chip leads to 8 successive roughly constant values of $r(n)$ and of $c(n)$ when synchronized. Because multiplicative format is used, $c(n)$ has values $\pm 1$. Then take the correlation $R(0)=\Sigma_{i\leq n<i+N} r(n)c(n)/N$ where the sum may be over 1–2 time slots (=10–20 symbols=2560–5120 chips=20480–40960 samples=0.67–1.33 ms) and the correlations $R_\pm(\delta)=\Sigma_n r(n)c(n\pm\delta)/N$ with the same sum range. Note that the correlations are normalized by dividing by the number of samples in the sums, N, and that in practice exact synchronization is unlikely, rather synchronization varying within ±0.7 sample is more likely. The correlations may be performed with specialized correlation coprocessors for integrated circuit implementations. A synchronization time adjustment (by 1 sample) may occur roughly once every symbol (=256 chips=67 us). This synchronizes the code generator of the finger with the timing of the strongest correlation which should be the strongest path of the group; in the case of two or more comparable-strength paths in the group the finger tracks an average.

(3) Form a matrix P of the cross-correlations of the early, on-time, and late correlation trajectories. Explicitly, set $$P = \begin{bmatrix} \rho_{EE} & \rho_{EO} & \rho_{EL} \\ \rho_{OE} & \rho_{OO} & \rho_{OL} \\ \rho_{LE} & \rho_{LO} & \rho_{LL} \end{bmatrix}$$

where E, O, and L subscripts denote early, on-time, and late. And the cross-correlations are defined over K pairs of time slots:

$\rho_{EE}=\Sigma_{1\leq k\leq K}R_{+,k}^*(\delta)R_{+,k}(\delta)/K$ $\rho_{EO}=\Sigma_{1\leq k\leq K}R_{+,k}^*(\delta)R_k(0)/K$ $\rho_{EL}=\Sigma_{1\leq k\leq K}R_{+,k}^*(\delta)R_{-,k}(\delta)/K$ and so forth where * denotes complex conjugate. Each correlation $R_k(0)$, $R_{\pm,k}(\delta)$ is computed over two time slots (the kth pair of time slots) and the number of correlations used, K, is taken to be 240. Of course, the normalization by dividing by K could be omitted and just scale the decision statistics.

The cross-correlation matrix can be reduced to a 2×2 matrix (e.g., use just two of the early, late, on-time) or extended to a 4×4 or 5×5 or larger matrix by, for example with 5×5, including a another sample ¼ chip prior to the early sample and a another sample ¼ chip after the late sample. These cross-correlations are normally computed from pilot symbols for both the downlink and uplink. Larger matrices provide more accuracy but at the cost of more computation.

In the downlink for frequency division duplex (FDD) mode in WCDMA, there is a common pilot channel (CPICH) which contains a predefined sequence of pilot symbols at 15000 symbols per second (15 ksps) for a chip rate of 3.84 Mcps and 256 chips per symbol. These symbols can be averaged for about two time slots (20 symbols) for most Doppler rates before cross-correlations are computed. For the uplink the pilot symbols are multiplexed with the data symbols, but they can again be averaged before computing cross-correlations. See FIG. 2.

(4) Evaluate the eigenvalues of the matrix P. Let the eigenvalues be in descending magnitude: $\lambda_1, \lambda_2, \lambda_3$ with $\lambda_3$ expected to be close to 0. Then if the ratio of $|\lambda_2|/|\lambda_1|$ is greater than a threshold (e.g., 0.001) assign a second finger to the group of paths. This threshold will be a function of the $E_b/N_o$ and can be set to balance off the probabilities of falsely declaring a second path and falsely missing multiple paths. The second finger is delayed one-quarter chip (2 samples) from the finger already tracking the group of paths and the first finger is advanced ¼ chip. The idea is that with two paths independently varying the second eigenvalue will be nonzero, whereas with two paths varying together only a single nonzero eigenvalue appears. And two fingers provides diversity advantage in the case of two independently varying paths.

(5) The eigenvalue ratio can be recomputed every 500 ms and the fingers reassigned among the groups of paths to provide the maximum overall $E_b/N_0$.

3. Eigenvalue Ratio Example

The connection between the eigenvalue ratio and the independently varying paths can be illustrated with an example: presume the received signal consists of two paths with complex channel factors (attenuation and phase shift) of $\alpha_1(t)$ and $\alpha_2(t)$, respectively. (Take the pilot symbol QPSK factor of 1+j to be part of the channel factors.) Then a finger synchronized to the first path receives baseband samples $r(n)=\alpha_1(n)c(n)+\alpha_2(n)c(n-\tau)+v(n)$ where $c(n)$ are the samples of the code, $\tau$ is the time delay of the paths and generally a function of time, and $v(n)$ is noise. Of course, for the finger to synchronize with the first path implies $|\alpha_1(n)|$ will generally be much larger than $|\alpha_2(n)|$; contrarily, for $\alpha_1(n)$ and $\alpha_2(n)$ of comparable magnitudes the finger will follow a weighted average as described in more detail below.

First consider a simple model of two paths: $\alpha_1(t)=\alpha_1$ and $\alpha_2(t)=\alpha_2+\beta t$; or in a sampled version $\alpha_1(n)=\alpha_1$ and $\alpha_2(n)=\alpha_2+\beta n/N$ where N is the number of samples in the sums defining the correlations. Thus this model presumes over some (short) time interval a first constant amplitude path and a second offset path with amplitude changing linearly in time. Then with 8 samples per chip and the notation that the kth pair of time slots are the samples in the range $kN\leq n<(k+1)N$ $$R_k(0) = \sum_{kN \leq n < (k+1)N} r(n)c(n)/N$$

$$= \sum_n [\alpha_1 c(n) + (\alpha_2 + \beta n/N)c(n-\tau) + v(n)]c(n)/N$$

$$= \sum_n [\alpha_1 + (\alpha_2 + \beta n/N)c(n-\tau)c(n) + v(n)c(n)]/N$$

$$\cong \alpha_1 + \left[\alpha_2 + \beta\left(k + \frac{1}{2}\right)\right](1 - |\tau|/8)$$

which follows from $c^2(n)=1$, $\Sigma_{kN \leq n < (k+1)N}$ $n/N=N(k+\frac{1}{2}-\frac{1}{2}N)$ together pseudo-random $\pm 1$ nature of $c(n)c(m)$ when n and m are samples from differing chips, and the noise average being 0. Similarly, the early and late correlations are (ignoring the noise):

$$R_{\pm,k}(\delta) = \sum_{kN \leq n < (k+1)N} r(n)c(n \pm \delta)/N$$

$$= \sum_n [\alpha_1 c(n) + (\alpha_2 + \beta n/N)c(n-\tau)]c(n \pm \delta)/N$$

$$= \sum_n [\alpha_1 c(n)c(n \pm \delta) + (\alpha_2 + \beta n/N)c(n-\tau)c(n \pm \delta)]/N$$

$$\cong \alpha_1(1 - \delta/8) + \left[\alpha_2 + \beta\left(k + \frac{1}{2}\right)\right](1 - |t \pm \delta|/8)$$

which again used the pseudo-random character of $c(n)c(m)$ for n and m samples from differing chips. Hence, the cross-correlation are $$\rho_{OO} = \sum_{1 \leq k \leq K} R_k*(0)R_k(0)/K$$

$$= \sum_{1 \leq k \leq K} \left\{\alpha_1^* + \left[\alpha_2^* + \beta^*\left(k + \frac{1}{2}\right)\right](1 - \tau/8)\right\}\{\alpha_1 +$$

$$\left[\alpha_2 + \beta\left(k + \frac{1}{2}\right)\right][(1 - \tau/8)\right\}/K$$

$$= \sum_{1 \leq k \leq K} \{|\alpha_1 + \alpha_2(1 - |\tau|/8)|^2 + [\alpha_1^* + \alpha_2^*(1 -$$

$$|\tau|/8)]\beta\left(k + \frac{1}{2}\right)(1 - |\tau|/8) +$$

$$[\alpha_1 + \alpha_2(1 - |\tau|/8)]\beta^*\left(k + \frac{1}{2}\right)(1 - |\tau|/8) +$$

$$|\beta|^2 \left(k + \frac{1}{2}\right)^2 (1 - |\tau|/8)^2 \bigg\}/K$$

$$\cong |\alpha_1 + \alpha_2(1 - |\tau|/8)|^2 + \{[\alpha_1^* + \alpha_2^*(1 - |\tau|/8)]\beta(1 - |\tau|/8) +$$

$$[\alpha_1 + \alpha_2(1 - |\tau|/8)]\beta^*(1 - |\tau|/8)\}K/2 +$$

$$|\beta|^2(1 - |\tau|/8)^2 K^2/3$$

where the sums over k were evaluated and approximated by:

$$\Sigma_{1 \leq k \leq k}(k+\frac{1}{2})/K = 1 + K/2 \cong K/2$$

$$\Sigma_{1 \leq k \leq k}(k+\frac{1}{2})^2/K = 11/12 + K + K^2/3 \cong K^2/3$$

The other cross-correlations have analogous terms but with extra factors including δ, for example:

$$\rho_{EO} = \sum_{1 \leq k \leq K} R^*_{+,k}(\delta)R_k(0)/K$$

$$= \sum_{1 \leq k \leq K} \left\{\alpha_1^*(1 - \delta/8) + \left[\alpha_2^* + \beta^*\left(k + \frac{1}{2}\right)\right](1 - |\tau + \delta|/8)\right\}\left\{\alpha_1 + \left[\alpha_2 + \beta\left(k + \frac{1}{2}\right)\right](1 - |\tau|/8)\right\}/K$$

$$= \sum_{1 \leq k \leq K} \{[\alpha_1^*(1 - \delta/8) + \alpha_2^*(1 - |\tau + \delta|/8)][\alpha_1 +$$

$$\alpha_2(1 - |\tau|/8)] + + [\alpha_1^*(1 - \delta/8) + \alpha_2^*(1 - |\tau + \delta|/8)]\beta[(k +$$

$$\frac{1}{2})(1 - |\tau|/8) + + \left[\beta^*\left(k + \frac{1}{2}\right)(1 - |\tau + \delta|/8)\right][\alpha_1 +$$

$$\alpha_2(1 - |\tau|/8)] + + |\beta|^2 \left(k + \frac{1}{2}\right)^2 (1 - |\tau|/8)(1 - |\tau +$$

$$\delta|/8)\}/K$$

$$\cong [\alpha_1^*(1 - \delta/8) + \alpha_2^*(1 - |\tau + \delta|/8)][\alpha_1 + \alpha_2(1 - |\tau|/8)] + +$$

$$[\alpha_1^*(1 - \delta/8) + \alpha_2^*(1 - |\tau + \delta|/8)]\beta(1 - |\tau|/8)K/2 + +$$

$$\beta^*(1 - |\tau + \delta|/8)[\alpha_1 + \alpha_2(1 - |\tau|/8)]K/2 + +$$

$$|\beta|^2(1 - |\tau|/8)(1 - |\tau + \delta|/8)K^2/3$$

and so forth.

To analyze the eigenvalues of the cross-correlation matrix, P, initially note that with β=0 (no time variance in the second path) the matrix P decomposes as the product of the vector $$A = \begin{bmatrix} \alpha_1(1 - \delta/8) & + & \alpha_2(1 - |\tau + \delta|/8) \\ \alpha_1 & + & \alpha_2(1 - \tau/8) \\ \alpha_1(1 - \delta/8) & + & \alpha_2(1 - |\tau - \delta|/8) \end{bmatrix}$$

with its Hermitian conjugate (adjoint), $A^H$. That is, $P(\beta=0)= AA^H$ and this makes the eigenvalues and eigenvectors apparent: $AA^H$ has one eigenvector A with eigenvalue equal to $|A|^2$, and two eigenvectors orthogonal to A, each with eigenvalue equal to 0. In this case the eigenvalue ratio of foregoing step (4) is 0 and precludes a second finger.

Imitate this decomposition for the general P by essentially completing the square for each of the matrix elements of P:

$$\rho_{OO} \cong |\alpha_1 + \alpha_2(1 - \tau/8)|^2 + \{[\alpha_1^* + \alpha_2^*(1 - \tau/8)]\beta(1 - \tau/8) + +$$

$$[\alpha_1 + \alpha_2(1 - \tau/8)]\beta^*(1 - \tau/8)\}K/2 + |\beta|^2(1 - \tau/8)^2 K^2/3$$

$$= \{\alpha_1^* + \alpha_2^*(1 - \tau/8) + \beta^*(1 - \tau/8)K/2\}\{\alpha_1 + \alpha_2(1 - \tau/8) +$$

$$\beta(1 - \tau/8)K/2\} + + |\beta|^2(1 - \tau/8)^2 K^2/12$$

$$\rho_{EO} \cong [\alpha_1^*(1 - \delta/8) + \alpha_2^*(1 - |\tau + \delta|/8)][\alpha_1 + \alpha_2(1 - \tau/8)] +$$

$$[\alpha_1^*(1 - \delta/8) + \alpha_2^*(1 - |\tau + \delta|/8)]\beta(1 - \tau/8)K/2 +$$

$$\beta^*(1 - |\tau + \delta|/8)[\alpha_1 + \alpha_2(1 - \tau/8)]K/2 + +$$

$$|\beta|^2(1 - \tau/8)(1 - |\tau + \delta|/8)K^2/3$$

$$= \{\alpha_1^*(1 - \delta/8) + \alpha_2^*(1 - |\tau + \delta|/8) + \beta^*(1 - |\tau + \delta|/8)K/2\} \times$$

$$\{\alpha_1 + \alpha_2(1 - \tau/8) + \beta(1 - \tau/8)K/2\} +$$

$$\beta\beta^*(1 - |\tau + \delta|/8)(1 - \tau/8)K^2/12$$

and so forth. Thus with the variable $z=\beta K/2$ and the vector B defined as $$B = \begin{bmatrix} (1-|\tau+\delta|/8) \\ (1-\tau/8) \\ (1-|\tau-\delta|/8) \end{bmatrix}$$

P decomposes as $P=(A+zB)(A+zB)^H+(zB/\sqrt{3})(zB/\sqrt{3})^H$. Thus P has two eigenvectors with nonzero eigenvalues in the span of $A+zB$ and $zB/\sqrt{3}$. The third eigenvector orthogonal to these two eigenvectors will have a 0 eigenvalue.

The form of P makes finding the two nonzero eigenvalues simple, and expanding in z for small z, the eigenvalues are:

$\lambda_{max}=|A+zB|^2+|<A+zB|zB/\sqrt{3}>|^2/|A+zB|^2+$ $\lambda_{min}=|zB/\sqrt{3}|^2-|<A+zB|zB/\sqrt{3}>|^2/|A+zB|^2+$ so the ratio of the smaller eigenvalue to the larger eigenvalue is:

$$\lambda_{min}/\lambda_{max} = \left|zB/\sqrt{3}\right|^2/|A+zB|^2 - |<A+zB|zB/\sqrt{3}>|^2/|A+zB|^4 + \ldots$$

$$= |z|^2(|B|^2|A|^2 - |<A|B>|^2)/3|A|^4 + \ldots$$

Thus the eigenvalue ratio varies as $|\beta K|^2$, and the greater the variation in the second path relative to the first path, the greater the eigenvalue ratio.

4. Alternative Eigenvalue Preferred Embodiments

In the foregoing method of eigenvalue ratio measurement, the bit energy to noise ratio ($E_b/N_0$) should be estimated, such as by measuring the energy and standard deviation of the correlation outputs. The cross-correlation matrix of the noise can be subtracted from the cross-correlation matrix of the received signal before the eigenvalues are computed, as is shown in FIG. 3. This noise cross-correlation matrix can be pre-computed for a range of possible $E_b/N_0$ values. Alternatively, the subtraction of the noise cross-correlation matrix can be omitted as shown in FIG. 4. In both cases the decision threshold can be adjusted based on the $E_b/N_0$. With a low $E_b/N_0$ better estimates can be obtained with the noise cross-correlation subtraction of FIG. 3. If the $E_b/N_0$ is high as with the CPICH pilot symbol channel on the downlink, then the noise cross-correlation matrix will be small and does not necessarily have to be subtracted before computing eigenvalues.

5. Bit Error Rate Preferred Embodiments

Another preferred embodiment method to determine whether one or two fingers of a rake receiver should be assigned to a group of paths which have phases separated by less than a chip interval compares the bit error rates (BER) of the two possibilities and selects the better. FIG. 5 illustrates a portion of the flow. In particular, both a single finger and two fingers are assigned and outputs are obtained for both configurations. The same single finger can be reused in the two finger configuration, or different fingers can be used. In either case, the received symbol sequences are decoded (deinterleaved, Viterbi decoding), and the CRC is checked. If the CRC passes, then the frame has been received correctly, and the data bits can be re-encoded as symbols. The re-encoded symbols can be compared against the stored-in-memory outputs (detected symbols) of the single finger and the two finger configurations. After averaging over many frames, the configuration with the lower BER will indicate whether there is a single path present or multiple independent paths. In more detail, proceed with the following steps, again presuming a WCDMA-type baseband signal consisting of a sequence of spread/scrambled QPSK symbols; the symbols arise from data encoding and interleaving. In particular, append a 16 cyclic redundancy check (CRC) bits to a data bit block (e.g., 3840 bits), turbo code with rate ⅓; then partition and interleave the coded blocks, and lastly encode the blocks as sequences of symbols.

(1) Perform an (standard) acquisition search of a received spread spectrum signal by correlation with translates of the spreading code to achieve coarse (half chip resolution) alignment; this determines the phase locations of all groups of received paths with signal exceeding a threshold where a group of paths means one or more paths with phase differences within a chip interval.

(2) For each group of paths with an assigned finger from step (1), perform fine synchronization by adjusting the code generator towards the 0 of discriminator $S=[R_+(\delta)^2-R_-(\delta)^2]/R(0)^2$ as previously described in connection with the eigenvalue preferred embodiments.

(3) For each synchronized finger from step (2) assign a second finger offset by half a chip (4 samples). Alternatively, for each synchronized finger (tracking unit) from step (2) assign a finger (detector) ¼ chip early of said synchronized finger and a second finger (detector) ¼ chip late of said synchronized finger. Detect symbols both using just the single finger from step (2) and using the two fingers together. Thus this detects two sequences of symbols. Store in memory both sequences (which should be the same if no errors occurred). A sequence of symbols over many radio frames (10 ms each) allows for averaging.

(4) Decode the sequence of symbols detected using the two finger configuration of step (3). If the CRC indicates no error, re-encode (CRC, turbo, interleave, . . . ) to regenerate the symbols.

(5) Compare the BERs of the single finger and two finger detected and stored symbol sequences of step (3) using the CRC-based decoding of step (4) as determining the correct or erased symbols. If the BER using two fingers is lower by a threshold amount than the BER of a single finger, use two fingers for the corresponding group of paths.

(6) Update the BER comparison every 500 ms, and reassign fingers according to the best overall BER.

6. Modifications

The preferred embodiments can be modified in various ways while retaining the features of a finger assignment decision based single-multiple independent path detection.

For example, the accuracy of determining the number of paths can be increased by increasing the averaging time (number of time slots used in cross-correlation computations or number of symbols in the BER comparisons). The receiver can also use these path estimation techniques over different time intervals, so even if an incorrect determination is made at one point in time, the receiver can eventually determine the correct number of paths. For instance, the multiple path determination could be performed once every 500 ms, and a simple majority logic decision could be made. For the eigenvalue ratio method, metrics other than the ratio of the two largest eigenvalues can be used to determine whether there are one or multiple paths. For example, the second largest eigenvalue can be compared to the smallest eigenvalues to find if it is significantly larger, which would indicate that there is a second signal path.

Another method is to compute early/late correlations relative to the on-time instant of the stronger path, such as correlations between the on-time sample and each of seven later samples can be computed. Similarly, correlations between the on-time sample and seven earlier samples can be computed. A comparison will then indicate the presence or not of a weaker path. In case that the arrival time of the stronger path is correctly estimated (error less than ½ sample), a sweep of early/late correlations around the stronger path in sample steps produces a certain pattern that can identify the existence of a weaker path (relative strength for identification depends on relative position) and its position. For an additive white gaussian noise channel, a likelihood ratio test can be generated to obtain probabilities of detection and false alarm. For a Rayleigh channel, these probabilities can be derived based on simulation derived thresholds.

More generally, cellular systems with the number of antennas, antenna spacing, and the array geometry can be varied; use beam forming and direction of arrival detection with antenna arrays; together with the multiple path determination methods.

What is claimed is:

1. A method of reception of said spread spectrum signal, comprising:
   (a) performing an acquisition search for a spread spectrum signal;
   (b) testing for multiple paths within a chip in an acquired signal from step (a) by comparing a bit error rate of detection of said acquired signal with a bit error rate of a combination of detections of offsets of said acquired signal; and
   (c) when testing from step (b) indicates multiple paths, assigning to said acquired signal two fingers with an offset between said two fingers of less than a chip.

2. A method of reception of said spread spectrum signal with a rake receiver, comprising the steps of:
   (a) performing an acquisition search for a spread spectrum signal;
   (b) assigning a finger to track an acquired signal from step (a);
   (c) analyzing said tracked signal from step (b); and
   (d) when the results of step (c) indicate two or more multipaths in said tracked signal, assigning a second finger to said tracked signal.

3. The method of claim 2, wherein said analyzing includes comparison of eigenvalues of a cross-correlation matrix of time-offsets of said tracked signal.

4. The method of claim 2, wherein said analyzing includes comparison of bit error rates for one finger tracking with two finger tracking for said tracked signal.

5. A rake receiver for a spread spectrum signal, comprising:
   (a) an acquisition unit for a received spread spectrum signal;
   (b) a plurality of fingers coupled to said acquisition unit, a first of said fingers including:
      (i) offset correlators for detection of multiple paths within a chip in a signal tracked by said first finger; and
      (ii) decision unit for comparison of outputs of said correlators for identification of multiple paths within a chip in said tracked signal;
   (c) an assignment unit for said fingers and coupled to said acquisition unit and to an output of said decision unit;
   (d) whereby a second finger is assigned to a signal tracked by said first finger when said decision unit identifies a second path in said tracked signal.

* * * * *